United States Patent Office
3,770,675
Patented Nov. 6, 1973

1

3,770,675
CURABLE EPOXIDIZED FATTY COMPOUND/
POLYESTER COATING COMPOSITION
David D. Taft, Minneapolis, Minn., assignor to
Ashland Oil, Inc., Ashland, Ky.
No Drawing. Filed Nov. 16, 1967, Ser. No. 683,734
The portion of the term of the patent subsequent to
May 6, 1987, has been disclaimed
Int. Cl. C09d 3/64
U.S. Cl. 260—22 EP    12 Claims

ABSTRACT OF THE DISCLOSURE

Curable epoxidized fatty compound/polyester coating compositions which may, preferably, exist as a two package system prior to use, are improved as to pot life and gloss, adhesion and toughness in the cured film by combining the polyester curing agent with a modified epoxy component such as a vinyl modified component.

DISCLOSURE

The present invention relates to curable coating compositions containing both a vinyl modified epoxy component and a polyester. More particularly the invention relates to improved epoxy/polyester resin, multipackage coating systems having a lengthened pot life; the system comprising, in a first package, a curable vinyl modified epoxy component and, in a second package, a polyester which serves as a curing agent for the epoxy component. When mixed together, the contents of these two packages are capable of forming hard, flexible, mar-resistant films on a variety of substrates (e.g., wood, metal, concrete and the like).

Robert Boller and Dr. Richard B. Graver have jointly developed and described in U.S. Pat. 3,218,274 (issued Nov. 16, 1965) a highly effective two package, coating composition. One of the two packages containing a curable epoxidized fatty compound, e.g., epoxidized soybean oil. The other package contained a polyester curing agent for the epoxidized fatty compound contained in the first package. At or about the time of use, the contents of the two packages were combined and the resulting mixture spread in film form on a suitable substrate (e.g., wood) and cured (e.g., by baking or air drying) to thereby provide a decorative or protective coating.

One significant advantage of a preferred embodiment of their two package coating system has been its ability to air dry at room temperature to form hard, mar-resistant, durable coatings. Cured films prepared from their two package coating system has exhibited highly desirable properties in terms of:

(1) their nonyellowing tendency,
(2) their ability to retain their original hard gloss for years without fading (although they can be made with a low gloss),
(3) their durability,
(4) their ability to be applied by brushing, spraying or rolling on common substrates such as wood, concrete and metal, and
(5) the ease with which dirt and common stains can be removed.

On concrete or earthenware, their coating system can provide a glazed, ceramic like appearance. The exceptional combination of functional and decorative qualities has made their coating system one of the most versatile coating systems yet produced.

It has also been found that polyester curing agents of the type developed by Boller and Graver can be modified to improve certain properties (e.g., to improve the caustic resistance) of the cured films obtained therefrom. Thus,

2 polyester curing agents of the general type developed by Boller and Graver are first prepared using as a part of the ester forming ingredients:

(1) a copolymerizable polycarboxylic acid or anhydride containing ethylenic unsaturation (e.g., maleic acid or anhydride),
(2) a copolymerizable polyhydric alcohol containing ethylenic unsaturation (e.g., diallyl ether of trimethylolpropane), or
(3) both of the foregoing.

Subsequent to the formation of the unsaturated polyester just described, it is copolymerized (using conventional techniques) with from 5 to 300 weight percent, preferably from 5 to 100 weight percent, e.g., 10 to 60 weight percent, of an ester of acrylic acid or methacrylic acid. The percentages just referred to are based on the weight of the unmodified polyester curing agent. Alternatively, a vinyl copolymer can first be prepared and then the esterification conducted in the presence of the copolymer and a polymerization catalyst. This is a less preferred technique. The resulting modified polyester curing agent can be viewed as an unsaturated polyester curing agent which has been modified by chemically bonding a vinyl polymer thereto. While not wishing to be bound to any theory, I believe that this vinyl tail, hanging from the polyester curing agent, in some way protects or screens ester linkages and thereby renders cured films obtained from this system more resistant to caustics and certain solvents.

The unmodified polyester curing agents are the simple esterification reaction products of polyhydric alcohols and polycarboxylic acid (or anhydrides). The unmodified polyester curing agent can be viewed as a partial ester or as a carboxyl terminated polyester having an average of at least two free carboxyl groups. It is convenient to think of the polyester curing agent as being a polyhydric alcohol having at least two hydroxyl groups esterified with polycarboxylic acid.

In its simplest form, the unmodified polyester curing agent can be viewed as follows:

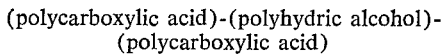
(polycarboxylic acid)-(polyhydric alcohol)-
(polycarboxylic acid)

Of course, the esterification reaction product may not be as simple as represented above. The esterification reaction may also yield some polymeric polyester, as well as some unreacted polycarboxylic acid and/or unreacted polyhydric alcohol. In any event, the predominant species is a simple alcohol centered, partial ester or carboxyl terminated polyester as represented above. This can be verified, in part, by a determination of number average molecular weight and infrared analysis. It should also be understood that more than two hydroxyl groups in a polyhydric alcohol can be esterified with polycarboxylic acid. For example, all three hydroxyl groups in trimethylolpropane can be esterified with chlorendic acid. Thus, the simple formula represented above should only be considered as illustrative of the type of material herein contemplated.

The esterification reaction product can also be represented by the structural formula:

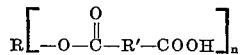

wherein $n$ is at least two (e.g., three or four), wherein R is the polyhydric alcohol residue, and wherein R' is the polycarboxylic acid residue.

Suitable polyhydric alcohols include: ethylene glycol; propylene glycol; glycerol; trimethylolethane; trimethylolpropane; sorbitol; pentaerythritol; dipentaerythritol; tripentaerythritol; and the like. Typically, these polyhydric alcohols will contain from 2–20, e.g., 3–15 carbon atoms and 2 or more e.g., 3–8 hydroxyl groups. Mixtures of polyhydric alcohols can be employed. The saturated, aliphatic polyhydric alcohols, particularly those saturated, aliphatic polyhydric alcohols having 3 or more hydroxyl groups, are preferred. Pentaerythritol (pure or technical grade) is particularly preferred.

Since it is necessary to introduce a copolymerizable ethylenic bond into the unmodified polyester curing agent, for subsequent vinyl modification all or a portion (e.g., 5 to 100 mole percent) of the polyhydric alcohol can be a vinyl polyhydric alcohol (or mixture thereof). The preferred unsaturated, copolymerizable polyhydric alcohols are the mono- and poly-allyl ethers of the common polyhydric alcohols just described. Such allyl ethers include the mono-allyl ether of trimethylol propane, the mono-allyl ether of ethylene glycol, the mono-allyl ethers of pentaerythritol, the mono-allyl ethers of sorbitan, the mono-allyl ethers of glycerol, the di-allyl ethers of pentaerythritol, the tri-allyl ethers of mannitol, and the like. If desired, the alkyl substituted (e.g., $C_1$-$C_6$ alkyl substituted) allyl ethers can be used, e.g., ethallyl ethers, dimethyl allyl ethers, etc. Particularly preferred vinyl or unsaturated alcohols are the allyl ethers of polyhydric alcohols having at least three (3) free hydroxyl groups (e.g., the mono-allyl ether of trimethylol propane).

In preparing the unmodified polyester curing agents, it is preferred to use a mixture of saturated polyhydric alcohol(s) and allyl ether(s). Such mixtures will typically contain from 40–90 mole percent of the saturated polyhydric alcohol(s) with the remainder being the allyl ether(s).

Suitable polycarboxylic acid include chlorendic acid (i.e., hexachloroendomethylene tetrahydrophthalic acid), maleic acid, trimellitic acid, tetrachlorophthalic acid, monochlorophthalic acid, tetrahydrophthalic acid, hexahydrophthalic acid, itaconic acid, citraconic acid, fumaric acid, and the like. The corresponding anhydrides can also be employed. Mixtures of polycarboxylic acids can be employed. The various phthalic acids and chlorendic acids are preferred. Chlorendic acid alone or in combination with a phthalic acid (e.g., phthalic anhydride), is particularly preferred. When a copolymerizable ethylenic bond is introduced into the unmodified polyester curing agent by means of an ethylenically unsaturated polycarboxylic acid, it is preferred to use the unsaturated acids in conjunction with other polycarboxylic acids (e.g., use maleic acid or anhydride in conjunction with chlorendic acid and/or phthalic anhydride). Maleic acid (and its anhydried) is the preferred copolymerizable, unsaturated acid. For purposes of this disclosure, the benzene carboxylic acids (e.g., phthalic acid) are not considered to possess a copolymerizable double bond.

In preparing the unmodified polyester curing agents, the esterification reaction mixture should initially contain (i.e., before any esterification takes place) a ratio of carboxyl to hydroxyl groups of from 1:1 to 3:1. Preferably, this ratio will be within the range of from 1.6:1 to 2.2:1, and even more preferably about 1.8 carboxyl groups for each hydroxyl group. Anhydride groups are treated as being equivalent to two (2) carboxyl groups. The resulting esterification reaction product should have an acid value of at least 50, and preferably of at least 100. Acid values over 140 (e.g., about 150 to 200), are especially desirable. When the alternative procedure of first forming the copolymer and then esterifying in the presence of the copolymer is employed, the unmodified polyester curing agents will not exist as such.

Regardless of the method used to form the modified polyester curing agents, they should have acid values of at least 30 and preferably above 50. Acid values above 80, e.g., from 80–180 are especially desirable.

Suitable acrylic monomers for modifying the unsaturated polyester curing agents include the $C_1$-$C_{18}$ alkyl and $C_1$-$C_{18}$ alkoxy alkyl esters of acrylic and methacrylic acids. Use of the lower alkyl esters (e.g., methyl methacrylate) generally results in harder films while the use of higher alkyl esters (e.g., lauryl methacrylate) provides more flexibility in the cured films. Examples of such acrylic monomers are methyl acrylate; ethyl acrylate; n-propyl acrylate; isopropyl acrylate; n-butyl acrylate; isobutyl acrylate; n-amyl acrylate; isoamyl acrylate; hexyl acrylate; 2-ethylhexyl acrylate; octyl acrylate, 3,5,5-trimethylhexyl acrylate; decyl acrylate; lauryl acrylate; dodecyl acrylate; cetyl acrylate; octadecyl acrylate; octadecenyl acrylate; ethyl methacrylate; n-propyl methacrylate; isopropyl methacrylate; butyl methacrylate; n-amyl methacrylate; sec.-amyl methacrylate; methyl methacrylate; 2-ethylhexyl methacrylate; octyl methacrylate, 3,5,5-trimethylhexyl methacrylate; decyl methacrylate; dodecyl methacrylate; octadecyl methacrylate; butoxyethyl acrylate; butoxyethyl methacrylate; other alkoxyalkyl acrylates or methacrylates, and the like. Mixtures of two or more of these acrylic monomers can be used, e.g., a mixture of ethyl acrylate and isobutyl acrylate. The $C_1$-$C_5$ alkyl esters of methacrylic acid (e.g., butyl methacrylate or methyl methacrylate) are the preferred esters.

In polymerizing the acrylic monomers, conventional polymerization techniques can be used. Common polymerization catalysts can be used. The polymerization catalyst will usually and preferably be one of the following: potassium persulfate; ammonium persulfate; azo-bis-isobutyronitrile; cumene peroxide; benzoyl peroxide; or diteritary butyl peroxide. Other suitable organic catalysts can be employed.

In addition it has been found possible to improve the solubility characteristics in mineral spirits of the acidic polyester curing agents shown in U.S. 3,218,274 by chemically incorporating (as opposed to blending) certain functional aliphatic compounds (e.g., an alkyl monocarboxylic acid) into the acidic polyesters. At the same time, it has been found desirable to minimize or preferably eliminate the non-chlorinated benzene carboxylic acids from the polyesters. In a particularly preferred embodiment, the improved polyesters consists of the reaction products of only:

(1) a polyhydric alcohol (e.g., pentaerythritol),
(2) a chlorinated dicarboxylic acid (e.g., chlorendic acid or anhydride), and
(3) an aliphatic hydrocarbyl monocarboxylic acid (e.g., a $C_{18}$ fatty acid).

These changes in solubility are important. Partial or complete elimination of aromatic and active solvents such as xylene and Cellosolve acetate means that the odor of, for example, paints made from these coating vehicles can be markedly improved and toxicity problems reduced. Furthermore, certain recently enacted city ordinances place severe limitations on the amount per day of aromatic solvents that can be discharged into the atmosphere. Thus, the use of mineral spirits enables one to use greater amounts of paint without exceeding these limits. Still further, the ability to be infinitely or completely diluted with a solvent becomes important when cleaning equipment, brushes and the like. Incomplete solubility will result in the formation of gummy particles, etc.

It has been observed that a noticeable improvement in solubility in mineral spirits begins when the modifying substituent (e.g., a fatty monocarboxylic acid) contains 8 or more carbon atoms in an uninterrupted straight or branched chain. This solubility in mineral spirits increases as higher and higher chain lengths are employed until complete or infinite solubility can be obtained at a chain length of about 18 carbon atoms (e.g., as in stearic acid).

Furthermore, it has been found possible to further improve the epoxy/polyester system if one employs certain functional vinyl monomers to modify the acidic polyesters.

When functional vinyl monomers (e.g., alkyl or dialkyl aminoalkyl acrylates or methacrylates) are employed it has been found that the rate of cure in thin films of epoxy/polyester mixtures is significantly increased, while the pot life is not appreciably altered (compared with the epoxy/polyester blends of U.S. 3,218,274). For some reason, presently unknown, the functional group introduced into the acidic polyester via the functional monomer has a catalytic effect on the curing of the epoxy component in thin films (i.e., wet films less than 0.01 inch thick, e.g., a 0.003 inch wet film).

It has now been discovered, according to the present invention, that these epoxy/polyester systems can be still further improved and much better pot life obtained, with cured films of the modified systems exhibiting a higher degree of gloss, adhesion and toughness when compared to the prior systems by combining the polyester curing agent including the vinyl modified and self-catalyzed vinyl modified polyester compositions previously described with a modified epoxy component which is prepared by reacting in the presence of the epoxidized component and a suitable solvent:

(1) an ester of an alpha beta-unsaturated carboxylic acid in which the ester portion contains $C_1$–$C_{18}$ C atoms, preferably $C_1$–$C_8$ C atoms, or
(2) a vinyl monomer (styrene, vinyl acetate, vinyl toluene, dibutyl itaconate, etc., or copolymerizable mixtures thereof) and optionally an ester of an alpha beta-unsaturated carboxylic acid in which the ester portion contains oxirane functionality.

Typical examples of monomers or comonomers which can be used in this application are methyl, ethyl, propyl, butyl, and/or 2-ethylhexyl acrylate or methacrylate; vinyl acetate, styrene; vinyl toluene; dialkyl itaconates or maleates; or copolymerizable mixtures thereof. Optionally glycidyl acrylate, glycidyl methacrylate, allyl glycidyl ether, etc. may be incorporated in the copolymer to increase the epoxide functionality of the modified epoxide component.

The modified epoxide component is blended with the polyester component immediately before use. The amount of polyester component to blend with the modified epoxide component can be, for example, the quantity required for stoichiometric reaction of the polyester acidity with the epoxy functionality in the epoxide component. This quantity may also vary according to the film properties desired in the final product.

The epoxide component will ordinarily be a curable, epoxidized fatty compound or any mixture thereof. Such epoxidized fatty compounds include epoxidized fatty oils, epoxidized fatty acid esters of monohydric alcohols, epoxidized fatty acid esters of polyhydric alcohols, epoxidized fatty nitriles, epoxidized fatty amides, epoxidized fatty amines, and epoxidized fatty alcohols. Such epoxidized fatty compounds are already well known in the art. Typically, these epoxidized fatty compounds will have 8 to 26 carbon atoms, e.g., 12 to 22 carbon atoms, in the fatty radicals and have an internal oxirane value of from 3 percent to 10 percent. I prefer that the oxirane value of the epoxidized fatty compounds be at least 5.5 percent.

If desired, epoxidized compounds of different types and oxirane values can be blended together to obtain various properties, e.g., improved resistance to yellowing, improved drying speed, and the like. However, it should be realized that improvements in certain properties are usually accompanied by a decrease in some other property. When a mixture of epoxidized fatty compounds has been used, I prefer that the mixture have an average oxirane value of at least 5.5 percent.

Particularly preferred for use as the epoxy component of this invention are the curable epoxidized esters of fatty acids. These epoxidized esters, having internal oxirane, will generally contain from 8 to 26 carbon atoms, e.g., 12 to 22 carbon atoms, in the fatty radicals and 1 to 10 carbon atoms in the mono- or polyhydric alcohol portion, with or without internal oxirane groups in the alcohol portion. Thus, the following epoxidized fatty acid esters are contemplated for use in this invention: epoxidized soybean oil; epoxidized linseed oil; epoxidized safflower oil; epoxidized 2-ethylhexyl tallate; epoxidized 1,5-pentanediol dioleate; epoxidized 1,2,6-hexanetriol dioleate monoacetate; epoxidized methyl oleate; epoxidized glycerol trilinoleate; epoxidized glycerol trioleate; epoxidized glycerol mono-oleate; epoxidized glycerol monolinoleate; epoxidized glycerol monostearate dilinoleate; epoxidized esters of mono-, di- or polypentaerythritol with soy, tall or linseed fatty acids; and the like. Mixtures of these esters can be used.

I do not mean to imply that all epoxidized fatty compounds (e.g., epoxidized fatty nitriles and epoxidized fatty esters) are equally effective in practicing the present invention. They are not. Thus, while one can obtain benefits from this invention by using as the epoxy component, for example, a blend of epoxidized methyl oleate and 9,10-epoxy octadecanol, I prefer to employ epoxidized fatty acid esters of saturated, aliphatic, polyhydric alcohols as the major epoxy component. Epoxidized glyceride oils (e.g., epoxidized linseed oil) are particularly preferred. I recommend that at least 80 weight percent and preferably 90 percent or more of the epoxy component be made up of the epoxidized fatty esters. Especially preferred are the epoxidized fatty acid esters of polyhydric alcohols having three or more hydroxyl groups before esterification. The remainder of the epoxy component can be some other epoxidized fatty compound (e.g., epoxidized oleyl nitrile) or a non-fatty epoxide. Alternatively, and more preferably, the epoxy component will consist essentially of an epoxidized ester or a mixture thereof.

If desired, up to 20 weight percent, e.g., 5 percent to 10 percent, of the epoxy component can consist of non-fatty epoxidized compounds such as the bisphenol-epichlorohydrin resins and alicyclic diepoxides. Thus, a portion of the epoxy component can be a material such as Epon 828, Unox 201, or the like. However, significant advantages have been observed (in terms of the performance of the epoxy/polyester system) when epoxidized materials having internal oxirane are employed. Because of these differences in performance (e.g., as reflected by the speed of drying, hardness, flexibility, tendency to yellow, and the like), I strongly prefer to employ an epoxidized fatty compound (or a mixture thereof) having internal oxirane of at least 80 weight percent, and preferably 90 weight percent or more, of the epoxy component.

In the preparation of the modified epoxide component the monomer(s) are introduced to the epoxide and optionally the solvent over a 30 minute to 5 hour period, more specifically a 1–3 hour period, and preferably a 1.5–2.5 hour period. The reaction is conducted at from 150 to 450° F. or preferably from 250 to 350° F. in the presence of typical copolymerization initiators. In addition the monomers may be copolymerized in bulk with subsequent addition of the epoxide material. The amount of vinyl monomer(s) modification varies according to the types of monomers and film properties desired. Thus, 10–90 parts of vinyl monomer can be copolymerized in the presence of 90–10 parts of epoxide component. Typically 40–75 parts of vinyl monomer(s) are copolymerized in the presence of 60–25 parts of epoxidized component.

Films prepared from blending the vinyl modified epoxide component with the polyester component can be cured at high temperatures, e.g., 250 to 350° F. for 20–30 minutes, or at room temperature. Films of these modified epoxide polyester blends exhibit outstanding gloss adhesion, and a greater degree of toughness when compared to unmodified epoxide polyester blends.

The present invention will be further understood by reference to the following examples in which, unless otherwise indicated, parts and percentages are by weight.

EXAMPLE I

A modified epoxide was prepared by adding a monomer mixture dropwise to 43 parts of epoxidized linseed oil (oxirane content=9.0%) in 21 parts of methyl isobutyl ketone. The monomer mixture which contained 20 parts of methyl methacrylate, 35 parts of styrene, 10 parts of glycidyl acrylate, 33.5 parts of ethyl acrylate, and 1.5 parts of azo-bis-isobutyronitrile was added during a 2 hour period at 250° F. The copolymer solution was heated for 2 hours whereupon 0.2 of a part of ditertiary butyl peroxide was added. The copolymer solution was heated an additional 90 minutes and cooled to give an opaque, viscous solution which had a nonvolatile content of 84.5%.

EXAMPLE II

A polyester component was prepared by heating at 200–290° F. a mixture of 8.34 parts of pentaerythritol, 14.8 parts of phthalic anhydride, 38.6 parts of chlorendic acid (1,4,5,6,7,7-hexachlorobicyclo(2.2.1)heptane-2,3-dicarboxylic acid anhydride), and 25.7 parts of xylene. The polyester was reacted to a nonvolatile acid value of 181 whereupon the reaction was cooled. The resultant polyester was diluted to 60% nonvolatile content by the addition of 5 parts of xylene, 7 parts of Cellosolve acetate, and 1 part of butanol. The viscosity was 16 stokes.

EXAMPLE III 50 parts of the modified epoxide prepared in Example I were mixed with 50 parts of the polyester curing agent of Example II. A .003" wet film was cast and cured at 250° F. for 20 minutes. The cured film had a Sward hardness of 50. The film had excellent gloss and adhesion. The adhesion was superior to that of a film prepared from an unmodified epoxidized oil and the polyester curing agent of Example II.

A .003" wet film was cast and allowed to cure at room temperature. After 16 hours the Sward hardness was 4, after 64 hours 10, and 15 days, 20.

EXAMPLE IV

A modified epoxide was prepared by adding a monomer mixture dropwise to 43 parts of epoxidized linseed oil and 30.7 parts of methyl isobutyl ketone as described in Example I. The monomer initiator mixture contained 25 parts of methyl methacrylate, 35 parts of styrene, 5 parts of glycidyl acrylate, 33.5 parts of ethyl acrylate, and 1.5 parts of azo-bis-isobutyronitrile. A booster addition of 0.2 part of ditertiary butyl peroxide was added as in Example I. A cloudy, viscous resin with a non-volatile content of 82.8% was obtained.

A blend of 52 parts of this resin with 50 parts of the polyester component of Example II was cast as a .003" wet film and cured for 20 minutes at 250° F. The cured film had excellent gloss and adhesion. A Sward hardness of 52 was observed. Similarly a .003" wet film was allowed to cure at room temperature for 12 days. The cured film had a Sward hardness of 22 and exhibited outstanding gloss and adhesion. The film was unaffected by treatment with 5% caustic for 90 minutes. No loss of adhesion or surface effect were observed after the caustic treatment.

EXAMPLE V

A monomer initiator mixture of 25 parts of methyl methacrylate, 35 parts of styrene, 38.5 parts of ethyl acrylate, and 1.5 parts of azo-bis-isobutyronitrile was added to a mixture of 43 parts of epoxidized linseed oil in 30.7 parts of methyl isobutyl ketone as described in Example I. A booster initiator of .2 part of ditertiary butyl peroxide was added as in Example I. A viscous, cloudy solution with a nonvolatile content of 81.9% was obtained.

A .003" wet film of a blend of 52 parts of this epoxide component and 50 parts of the polyester component was cast and cured at 250° F. for 20 minutes. An opaque glossy film with a Sward hardness of 52 was observed. Similarly, a .003" wet film was allowed to cure at room temperature for 12 days. A glossy, highly adhesive film with a Sward hardness of 20 was obtained.

EXAMPLE VI

The identical monomer initiator booster combination as in Example I was processed at 350° F. in a Parr bomb using the same amounts of epoxidized oil and methyl isobutyl ketone as solvents. The resultant clear resin had a lower viscosity (91 stokes) than Example I with a nonvolatile content of 84.5%.

A blend of 50 parts of this polyester was mixed with 50 parts of the polyester component of Example II. A .003" wet film was cast and cured at 250° F. for 20 minutes. The film had a Sward hardness of 58 and was unaffected by treatment with 5% caustic solution for 30 minutes.

EXAMPLE VII

A blend of 33 parts of the epoxide component described in Example VI was blended with 4 parts of methyl isobutyl ketone. To this component was added 30 parts of an acrylic modified polyester component. This acrylic modified polyester component was prepared by reacting together 84 parts of pentaerythritol, 125.8 parts of phthalic anhydride, 14.7 parts of maleic anhydride, 386.3 parts of chlorendic acid for about 6 hours at 278–290° F. The unmodified polyester was copolymerized with 63 parts of butyl methacrylate, 65 parts of methyl methacrylate, and 7 parts of dimethyl aminoethyl methacrylate using 6 parts of ditertiarybutyl peroxide initiator as described in copending, commonly assigned Ser. No. 570,690, filed Aug. 8, 1966, now U.S. Pat. No. 3,455,858, issued July 15, 1969. The modified polyester was prepared in a xylol-methyl isobutyl ketone solvent combination. The modified system exhibited a viscosity of 88 stokes at an acid value (nonvolatile) of 122 and a nonvolatile content of 67.8%.

A .003" wet film of this blend was cast and cured at 250° F. for 1 hour. The cured film had excellent gloss and exhibited a Sward hardness of 62. In addition a .003" wet film was allowed to dry at room temperature. The film exhibited a Sward hardness of 8 at 16 hours which increased to 20 at 64 hours. The film had outstanding gloss and exhibited excellent adhesion.

The blend of the polyester component and epoxide component usually has a limited potlife (24–28 hours). This is especially true of an unmodified polyester unmodified epoxide blend. The blends of this invention have more extended potlives. For example, the viscosity of the blend of this example which was initially 19 stokes increased to 105 after 40 hours. Thus, clear films could still be cast from the modified epoxide system while the unmodified system had gelled.

What is claimed is:
1. In a composition comprising the reaction product of:
   (A) a polyester selected from the group consisting of:
      (1) the esterification reaction product of a polyhydric alcohol and a polycarboxylic acid, and
      (2) the esterification reaction product of a polyhydric alcohol and polycarboxylic acid and a fatty substance free of terminal unsaturation and having more than 8 carbon atoms, wherein the ratio of carboxyl to hydroxyl groups before esterification was from 1:1 to 3:1; and
   (B) a curable epoxidized fatty compound,
      the improvement comprising the modification of
      (B) by reaction thereof with a material selected from the group consisting of:
         (1) an ester of an alpha-beta unsaturated carboxylic acid free of oxirane functionality and in which the ester portion contains 1–18 carbon atoms;
         (2) a vinyl monomer selected from the group consisting of styrene, vinyl acetate and vinyl toluene; and
         (3) an ester of an alpha-beta unsaturated carboxylic acid in which the ester portion contains oxirane functionality.

2. The product of claim 1, wherein the polyester of part (A) is the esterification reaction product of a polyhydric alcohol and a polycarboxylic acid wherein at least one of the group consisting of polyhydric alcohol and polycarboxylic acid is copolymerizable and ethylenically unsaturated.

3. The reaction product of claim 1, in which the polyester of part (A) is the esterification reaction product of a polyhydric alcohol and polycarboxylic acid wherein both the polyhydric alcohol and polycarboxylic acid are copolymerizable and ethylenically unsaturated.

4. The reaction product of claim 1, wherein the polyester of part (A) is the esterification reaction product of a polyhydric alcohol and polycarboxylic acid and an unsaturated fatty substance, free of terminal unsaturation and having more than 8 carbon atoms wherein the ratio of carboxyl to hydroxyl groups before esterification was from 1:1 to 3:1; and, wherein at least one of the groups consisting of polyhydric alcohol and polycarboxylic acid is copolymerizable and ethylenically unsaturated.

5. The reaction product of claim 1, wherein the polyester described in part (A) is modified from 5 to 300%, based on the weight of said unsaturated polyester with a polymerizable ester of acrylic or methacrylic acid or a mixture of such esters.

6. The reaction product of claim 3, wherein the polyester described in part (A) is modified from 5 to 300%, based on the weight of said unsaturated polyester, with a polymerizable ester of acrylic or methacrylic acid or a mixture of such esters.

7. The reaction product of claim 4, wherein the polyester described in part (A) is modified from 5 to 300%, based on the weight of said unsaturated polyester with a polymerizable ester of acrylic or methacrylic acid or a mixture of such esters.

8. A substrate coated with the cured film obtained by curing on said substrate a mixture of the coating system of claim 1.

9. A substrate coated with the cured film obtained by curing on said substrate a mixture of the coating system of claim 2.

10. A substrate coated with the cured film obtained by curing on said substrate a mixture of the coating system of claim 3.

11. A substrate coated with the cured film obtained by curing on said substrate a mixture of the coating system of claim 4.

12. A substrate coated with the cured film obtained by curing on said substrate a mixture of the coating system of claim 5.

References Cited
UNITED STATES PATENTS

| | | | |
|---|---|---|---|
| 2,819,234 | 1/1958 | Dunlap et al. | 260—22 |
| 3,196,119 | 7/1965 | Boller et al. | 260—22 |
| 3,218,274 | 11/1965 | Boller et al. | 260—22 |
| 3,224,989 | 12/1965 | Nevin | 260—23 |

DONALD E. CZAJA, Primary Examiner

R. W. GRIFFIN, Assistant Examiner

U.S. Cl. X.R.

117—161 K; 260—22 CB, 23 EP

UNITED STATES PATENT OFFICE
CERTIFICATE OF CORRECTION

Patent No. 3,770,675   Dated November 6, 1973

Inventor(s) David D. Taft

It is certified that error appears in the above-identified patent and that said Letters Patent are hereby corrected as shown below:

In Column 1, line 38; "containing" should be corrected to --contained--.

Signed and sealed this 8th day of October 1974.

(SEAL)
Attest:

McCOY M. GIBSON JR.
Attesting Officer

C. MARSHALL DANN
Commissioner of Patents